United States Patent
Wang et al.

(10) Patent No.: US 10,107,360 B2
(45) Date of Patent: Oct. 23, 2018

(54) CONVEYOR BELT CONNECTING DEVICE AND CONVEYOR BELT DRIVING DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Wensong Wang, Beijing (CN); Jinwei Zhu, Beijing (CN); Zhirui He, Beijing (CN); Sunwu Xie, Beijing (CN); Namin Kwon, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 203 days.

(21) Appl. No.: 15/152,126

(22) Filed: May 11, 2016

(65) Prior Publication Data

US 2017/0089425 A1   Mar. 30, 2017

(30) Foreign Application Priority Data

Sep. 28, 2015   (CN) .......................... 2015 1 0629421

(51) Int. Cl.
*F16G 3/08*   (2006.01)

(52) U.S. Cl.
CPC ....................... *F16G 3/08* (2013.01)

(58) Field of Classification Search
CPC ....................... F16G 3/08; F16G 3/06
See application file for complete search history.

(56) References Cited

U.S. PATENT DOCUMENTS 1,686,300 A * 10/1928 Vollrath .................... F16G 3/06
                                                           24/135 R
3,093,005 A * 6/1963 Dean ......................... F16G 3/08
                                                           198/847

(Continued)

FOREIGN PATENT DOCUMENTS

CN       1450963 A      10/2003
CN    201293069 Y        8/2009

(Continued)

OTHER PUBLICATIONS

Second Office Action regarding Chinese Application No. 201510629421.5, dated Jun. 22, 2017. Translation provided by Dragon Intellectual Property Law Firm.

(Continued)

*Primary Examiner* — Robert Sandy
*Assistant Examiner* — Matthew J Sullivan
(74) *Attorney, Agent, or Firm* — Harness, Dickey & Pierce, P.L.C.

(57) ABSTRACT

A conveyor belt driving device. The conveyor belt connecting device has: a connecting body provided with a clamping space; a positioning structure with a positioning face, wherein a segment to be connected of a conveyor belt is oppositely abuts against the positioning face, and the segment to be connected of the conveyor belt and the positioning structure are simultaneously provided in the clamping space; and a fixing element penetrating through the connecting body and pressed against the positioning structure, wherein the segment to be connected and the positioning structure are fixed in the clamping space of the connecting body by the pressing of the fixing element.

13 Claims, 2 Drawing Sheets

(56) References Cited

U.S. PATENT DOCUMENTS

| | | | | |
|---|---|---|---|---|
| 5,979,639 A * | 11/1999 | Sytema | ................. | B65G 17/42 |
| | | | | 198/731 |
| 7,810,219 B2 * | 10/2010 | Lindemann | ............... | F16G 3/08 |
| | | | | 24/31 R |
| 9,169,106 B2 * | 10/2015 | Christen | ................. | B66B 13/08 |
| 9,347,520 B2 * | 5/2016 | Wolf | ........................ | F16G 3/10 |
| 2017/0023101 A1 * | 1/2017 | Jager | ........................ | F16G 3/06 |
| 2017/0241511 A1 * | 8/2017 | Jakob | ........................ | F16G 3/08 |

FOREIGN PATENT DOCUMENTS

| | | |
|---|---|---|
| CN | 102865330 A | 1/2013 |
| CN | 203023390 U | 6/2013 |
| CN | 203809598 U | 9/2014 |
| JP | H05-58421 A | 3/1993 |
| JP | 2001335130 A | 12/2001 |

OTHER PUBLICATIONS

First Office Action regarding Chinese application No. 201510629421.5, dated Dec. 2, 2016. Translation provided by Dragon Intellectual Property Law Firm.

Third Office Action regarding Chinese Application No. 201510629421.5, dated Jan. 24, 2018. Translation provided by Dragon Intellectual Property Law Firm.

* cited by examiner

CONVEYOR BELT CONNECTING DEVICE AND CONVEYOR BELT DRIVING DEVICE

CROSS-REFERENCE TO RELATED APPLICATION

The present application claims a priority of the Chinese patent application No. 201510629421.5 filed on Sep. 28, 2015, which is incorporated herein by reference in its entirety

TECHNICAL FIELD

The present disclosure relates to the field of mechanical equipment, in particular to a conveyor belt connecting device and a conveyor belt driving device.

BACKGROUND

In mechanical equipments using a conveyor belt in the prior art, during the operation of the conveyor belt, the ends of a single conveyor belt 1 (as shown in FIG. 1) usually need to be coupled together to form an annular shape, and then the conveyor belt 1 is connected to wheels 2 so as to drive the conveyor belt 1 to move. In this case, there is a need to provide a connecting structure which can connect two separated ends of the conveyor belt together. In addition, there is a need to connect the annular conveyor belt to other external driving devices. In this case, therefore, there is a need to provide a connecting structure which can both connect to a conveyor belt and an external driving device.

The conveyor belt connecting device in the prior art for connecting two separated ends of the conveyor belt together or connecting the conveyor belt with an external driving device is usually fixedly connecting the two separated ends of the conveyor belt together or connecting the conveyor belt with the external driving device by screw connection by means of punching holes in the conveyor belt. However, such method will decrease the intensity of the conveyor belt and greatly shorten its service life.

SUMMARY

The object of the technical solution according to the present disclosure is to provide a conveyor belt connecting device and a conveyor belt driving device, which can solve the problems of decreasing the intensity of the conveyor belt resulting from punching holes in the conveyor belt and thereby shortening its service life.

The present disclosure provides a conveyor belt connecting device, comprising:
  a connecting body provided with a clamping space;
  a positioning structure comprising a positioning face, wherein a segment to be connected of a conveyor belt is oppositely abuts against the positioning face, and the segment to be connected of the conveyor belt and the positioning structure are simultaneously provided in the clamping space; and
  a fixing element penetrating through the connecting body and pressed against the positioning structure, wherein the segment to be connected and the positioning structure are fixed in the clamping space of the connecting body by means of the pressing of the fixing element.

Preferably, the segment to be connected is provided with a plurality of parallel toothed ridges, and the positioning face is provided with meshing teeth which are meshed with the toothed ridges.

Preferably, the positioning structure comprises a pressing plate on which the positioning face is provided, wherein the pressing plate comprises a pressing face opposite to the positioning face, and the fixing element is pressed against the pressing face.

Preferably, the positioning structure comprises a pressing plate and a pad, between which the segment to be connected is provided, and the fixing element is pressed against the pressing plate, wherein the positioning face is provided on the pressing plate or the pad.

Preferably, the pressing plate or the pad provided with the positioning face has the same structure and is made of the same material as the segment to be connected.

Preferably, the connecting body or the positioning structure is provided with limit protrusions for preventing relative movement between the connecting body and the positioning structure.

Preferably, the positioning structure is provided with a positioning slot, wherein the limit protrusions are formed on both sides of the positioning slot, and a part of the connecting body is provided within the positioning slot.

Preferably, the clamping space penetrating through a first end face and a second end face of the connecting body which are opposite to each other, and the segment to be connected extends from the first end face to the second end face.

Preferably, the connecting body is provided with an opening on a third end face connected with the first end face and the second end face, and the clamping space is exposed through the opening.

Preferably, the connecting body is further provided with connecting holes for the connection to a driving device.

Preferably, the fixing element comprises a plurality of screws.

Preferably, the segment to be connected is of an entire segment structure connected in one piece, or comprises a first connecting segment and a second connecting segment which are separated from each other.

The present disclosure further provides a conveyor belt driving device, comprising the conveyor belt connecting device described above.

At least one of the technical solutions according to some embodiment of the present disclosure has the following advantageous effect.

The conveyor belt connecting device of the present disclosure fixedly connecting a segment to be connected of the conveyor belt with a connecting body, by means of providing a combination of the segment to be connected and a positioning structure in a clamping space of the connecting body and pressing them with a fixing element. Therefore, such structure can complete the connection of the segment to be connected with the connecting body without punching holes in the conveyor belt and will not decrease the intensity of the conveyor belt, and thereby ensure that its service life will not be affected.

DETAILED DESCRIPTION

Figure 1:
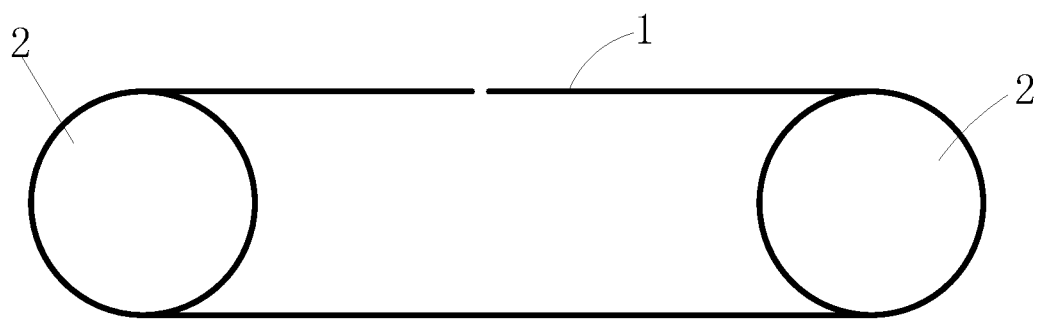
FIG. 1 is a schematic view showing a structure of a conveyor belt during use in the prior art.

The objects, technical solutions and advantages of the present disclosure will be more clearly in the following description when taken in conjunction with the embodiments and the accompanying drawings.

The conveyor belt connecting device according to some embodiment of the present disclosure, comprising:
- a connecting body provided with a clamping space;
- a positioning structure comprising a positioning face, wherein a segment to be connected of a conveyor belt is oppositely abuts against the positioning face, and the segment to be connected of the conveyor belt and the positioning structure are simultaneously provided in the clamping space; and
- a fixing element penetrating through the connecting body and pressed against the positioning structure, wherein the segment to be connected and the positioning structure are fixed in the clamping space of the connecting body by means of the pressing of the fixing element.

The conveyor belt connecting device having the above-described structure fixedly connecting the segment to be connected of the conveyor belt with a connecting body, by means of providing a combination of the segment to be connected and the positioning structure in the clamping space of the connecting body and pressing them with the fixing element. Therefore, such structure can complete connection of the segment to be connected with the connecting body without punching holes in the conveyor belt, which will not decrease the intensity of the conveyor belt and thereby ensure that its service life will not be affected.

Specifically, the conveyor belt connecting device may be used for coupling both ends of a strip-shaped conveyor belt together to form an annular shape. In this case, the segment to be connected provided in the clamping space of the connecting body comprises a first connecting segment and a second connecting segment which are separated from each other. The conveyor belt connecting device may be further used for connecting the annular shaped conveyor belt with an external driving device. In this case, the segment to be connected provided in the clamping space of the connecting body is either comprised of a first connecting segment and a second connecting segment which are separated from each other, or be a part of the annular conveyor belt, so as to form an entire segment structure connected in one piece.

Preferably, the positioning face of the positioning structure is provided with protruded meshing teeth for increasing the friction force caused by contacting with the conveyor belt. Especially, when the conveyor belt connecting device is applied to a conveyor belt having toothed ridges which are parallel to each other, as the meshing teeth on the positioning face are meshed with the toothed ridges on the segment to be connected of the conveyor belt, stable connection between the positioning structure and the segment to be connected can be ensured and therefore causing them less likely to be separated.

The specific structure of the conveyor belt connecting device according to the present disclosure will be described in details with respect to the case in which both ends of the strip-shaped conveyor belt are coupled together to form an annular shape.

First Embodiment

Figure 2:
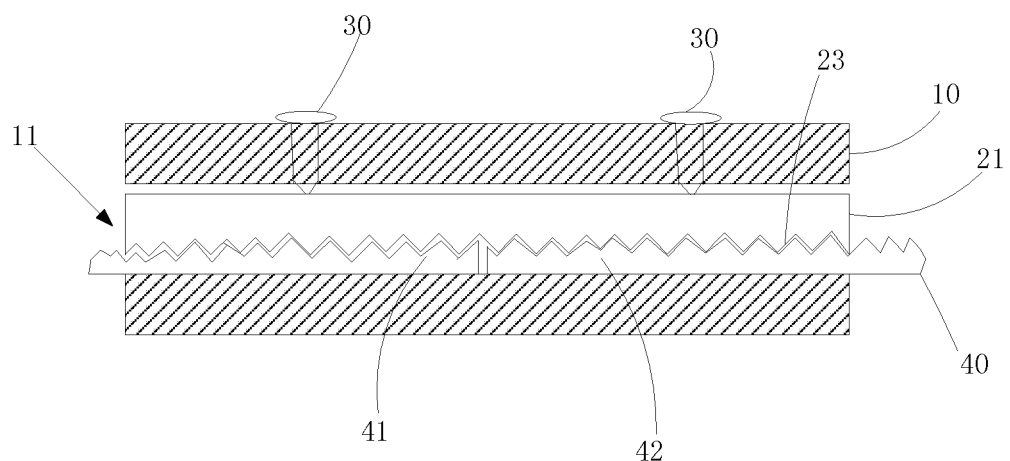
FIG. 2 is a schematic view showing a sectional structure of a conveyor belt connecting device according to a first embodiment of the present disclosure.

FIG. 2 is a schematic view showing a sectional structure of a conveyor belt connecting device according to a first embodiment of the present disclosure. Referring to FIG. 2, the conveyor belt connecting device according to the first embodiment comprises a connecting body 10, a positioning structure and a fixing element.

Wherein a clamping space 11 penetrates through a first end face and a second end face of the connecting body 10 which are opposite to each other. The positioning structure comprises a pressing plate 21, wherein the pressing plate 21 and a segment to be connected of a conveyor belt 40 are combined to be provided in the clamping space 11. In the first embodiment of the present disclosure, a first connecting end 41 and a second connecting end 42 of the conveyor belt 40 which are separated from each other are coupled together so that the conveyor belt 40 is formed into an annular shape, and the pressing plate 21 is abuts against a portion where the first connecting end 41 and the second connecting end 42 are coupled together and is provided in the clamping space 11, wherein a part of the conveyor belt which abuts against the pressing plate 21 is formed into the segment to be connected.

Preferably, in the first embodiment of the present disclosure, a positioning face 23 on which the pressing plate 21 abuts against the segment to be connected is provided with meshing teeth, which are meshed with parallel toothed ridges on the segment to be connected so as to secure the connection between the pressing plate 21 and the segment to be connected.

Further, in the first embodiment, the fixing element comprises a plurality of screws 30 as shown in FIG. 2. The screws 30 penetrate through the connecting body 10 above the pressing plate 21 and pressed against the pressing plate 21. By the pressing of the screws 30, the combination of the pressing plate 21 and the segment to be connected of the conveyor belt 40 is clamped in the clamping space 11 such that the segment to be connected of the conveyor belt 40 is fixed to the connecting body 10 and less likely to be separated.

With the conveyor belt connecting device according to the first embodiment, connection of the segment to be connected to the connecting body can be realized without punching holes in the conveyor belt, so that two separated ends of the conveyor belt are connected together without decrease the intensity of the conveyor belt and thereby its service life will not be affected.

Second Embodiment

Figure 3:
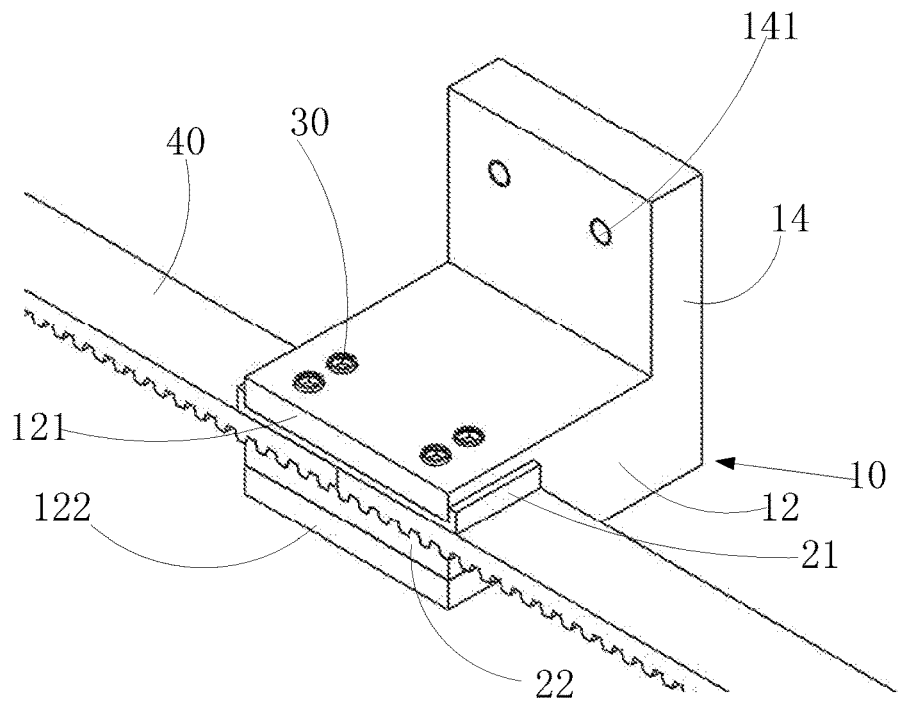
FIG. 3 is a schematic view showing a three-dimensional combination structure of a conveyor belt connecting device according to a second embodiment of the present disclosure.

FIG. 3 is a schematic view showing a three-dimensional structure of a conveyor belt connecting device according to a second embodiment of the present disclosure. Referring to FIG. 3, similar to the first embodiment, the conveyor belt connecting device in the second embodiment comprises a connecting body 10, a fixing structure and a fixing element.

Specifically, the connecting body 10 comprises a block-shaped first structure part 12, and a clamping space 11 penetrating through a first end face and a second end face of the first structure part 12 which are opposite to each other. In the second embodiment, the positioning structure comprises a pressing plate 21 and a pad 22, wherein a segment to be connected of a conveyor belt is provided between the pressing plate 21 and the pad 22, and a combination of the segment to be connected with the pressing plate 21 and the pad 22 is provided in the clamping space 11.

Similar to the first embodiment, the conveyor belt connecting device of the second embodiment is used for coupling a first connecting end 41 and a second connecting end 42 of the conveyor belt 40 which are separated from each other so that the conveyor belt 40 is formed in an annular shape, wherein a part of the conveyor belt 40 where the conveyor belt 40 is combined with the pressing plate 21 and the pad 22 and provided in the clamping space 11 forms a segment to be connected.

In the second embodiment of the present disclosure, a first surface of the segment to be connected of the conveyor belt 40 abuts against the pressing plate 21, and the first surface is formed into a smooth surface. A second surface of the segment to be connected of the conveyor belt 40 abuts against the pad 22, and the second surface is provided with a plurality of parallel toothed ridges. A surface where the pad 22 abuts against the second surface of the conveyor belt 40 is formed into a positioning face, which is provided with meshing teeth which are meshed with the toothed ridges. The meshing between the pad 22 and the segment to be connected ensures their stable connection. Further, a surface where the pad 21 abuts against the first surface of the segment to be connected is preferably provided with a certain roughness so as to secure the connection between the pad 21 and the segment to be connected.

Of course, when the pressing plate 21 abuts against the second surface of the conveyor belt 40 provided with the toothed ridges, the surface where the pressing plate 21 abuts against the second surface may be also formed into a positioning face and provided with meshing teeth meshed with the toothed ridges of the second surface.

In the embodiments of the present disclosure, the pressing plate 21 or pad 22 provided with the positioning face may has the same structure or made of the same material as the segment to be connected, i.e., has the same structure or made of the same material as the conveyor belt 40. Specifically, the pressing plate or the pad may be made by a segment cut from the conveyor belt with the same structure and size as the pressing plate or the pad, so as to ensure that the meshing teeth on the positioning face completely match with the toothed ridges on the second surface, and secure the connection of the positioning face to the second surface, as well as achieve the object of easy manufacturing and saving material.

In the present disclosure, in order to prevent relative movement between the connecting body and the positioning structure, the connecting body or the positioning structure is preferably provided with limit protrusions.

Figure 4:
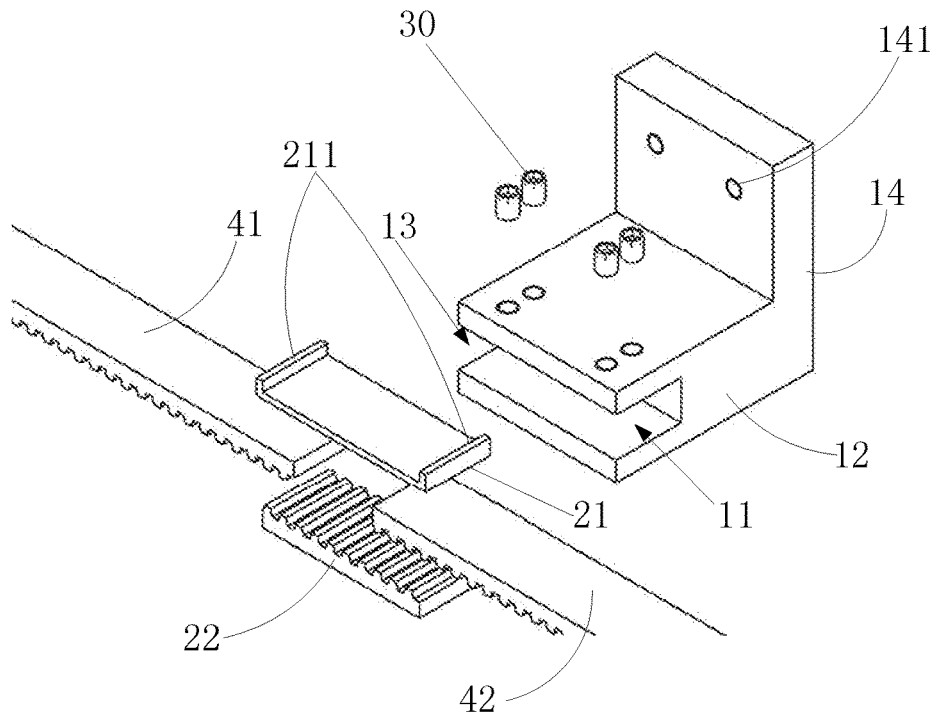
FIG. 4 is a schematic view showing a three-dimensional exploded structure of the conveyor belt connecting device according to the second embodiment of the present disclosure.

In the second embodiment of the present disclosure, as shown in FIGS. 3 and 4, the connecting body 10 is provided with an opening 13 on a third end face of the first structure part 12 connected with the first end face and the second end face, and the clamping space 11 is exposed through the opening 13. With the opening 13, the combined structure of the pressing plate 21, the pad 22 and the segment to be connected can be provided in the clamping space 11. Based on this structure, the clamping space 11 divides the first structure part 12 of the connecting body 10 into an upper plate body 121 and a lower plate body 122.

Further, a surface where the pressing plate 21 abuts against the upper plate body 121 is provided with a positioning slot. The sides of the positioning slot along a length direction of the conveyor belt are formed into limit protrusions 211. The upper plate body 121 is embedded into the positioning slot. With the limit protrusions 211 on both sides, the connecting body 10 may be prevented from moving with respect to the pressing plate 21 when the conveyor belt moves.

Similar to the first embodiment, the fixing element for pressing against the positioning structure in the second embodiment comprises a plurality of screws 30, which penetrating through the upper plate body 121 and pressed against the pressing plate 21. By means of the pressing of the screws 30, the combination of the pressing plate 21, the segment to be connected and the pad 22 is clamped in the clamping space 11, so as to ensure the fixation of segment to be connected of the conveyor belt 40 to the connecting body 10 and less likely to be separated.

Using the conveyor belt connecting device with the structure described in the above embodiments, connection of the segment to be connected of the conveyor belt to the connecting body can be realized without punching holes in the conveyor belt, the connection between two separated ends of the conveyor belt will therefore not decrease the intensity of the conveyor belt so as to ensure that its service life will not be affected.

The conveyor belt connecting device according to the second embodiment of the present disclosure may also be applied to the connection of an external driving device to a conveyor belt. Specifically, referring to FIG. 3, the connecting body 10 further comprises a second structure part 14, which is connected and perpendicularly to the first structure part 12 and provided with connecting holes 141 for connecting to the external driving device. The conveyor belt is driven by the external driving device connected thereto.

With such structure which not only enables the connection between two separated ends of the conveyor belt but also enables the connection of the external driving device to the conveyor belt, the conveyor belt connecting device will be applied more widely.

Some embodiment according to the present disclosure further provide a conveyor belt driving device comprising the conveyor belt connecting device with the above-described structure, the conveyor belt driving device is connected to the conveyor belt via the conveyor belt connecting device. The specific structure of the conveyor belt connecting device provided in the conveyor belt driving device has been described above, and will not describe hereinafter.

With the conveyor belt connecting device of the structure described in the above embodiments, connection of the segment to be connected of the conveyor belt to the connecting body can be realized without punching holes in the conveyor belt. Therefore the connection between two separated ends of the conveyor belt or the connection of the external driving device to the conveyor belt will not decrease the original intensity of the conveyor belt and thus its service life will not be affected. Besides, as compared with the prior art, the present disclosure further has the advantages of reliable connection, easy operating, labor and time saving, and reusability.

Further, with such structure which not only enables the connection between two separated ends of the conveyor belt but also enables the connection of the external driving device to be connected to the conveyor belt, the conveyor belt connecting device according to the present disclosure will be applied more widely.

The above description only shows preferred embodiments of the present disclosure, and it should be pointed out that for one of ordinary skills in the art, many improvements and modifications can be made without departing from the principle of the present disclosure, and all these improvements and modifications shall fall into the protection scope of the present disclosure.

What is claimed is:

1. A conveyor belt connecting device, comprising:
a connecting body provided with a clamping space;
a positioning structure comprising a positioning face, wherein a segment to be connected of a conveyor belt is oppositely abuts against the positioning face, and the segment to be connected of the conveyor belt and the positioning structure are simultaneously provided in the clamping space of the connecting body; and
a fixing element penetrating through the connecting body and pressed against the positioning structure, wherein the segment to be connected and the positioning structure are fixed in the clamping space of the connecting body by means of the pressing of the fixing element,
wherein the connecting body or the positioning structure is provided with limit protrusions for preventing relative movement between the connecting body and the positioning structure,
wherein the positioning structure is provided with a positioning slot, wherein the limit protrusions are formed on both sides of the positioning slot, and a part of the connecting body is provided within the positioning slot,
wherein the positioning structure comprises a pressing plate and a pad, and the positioning slot is provided on the pressing plate,
wherein the connecting body comprises a first structure part and a second structure part which are perpendicular to each other, and the clamping space is provided in the first structure part and divides the first structure part into an upper plate body and a lower plate body, wherein the upper plate body is embedded into the positioning slot.

2. The conveyor belt connecting device according to claim 1, wherein the segment to be connected is provided with a plurality of parallel toothed ridges, and the positioning face is provided with meshing teeth which are meshed with the toothed ridges.

3. The conveyor belt connecting device according to claim 2, wherein the positioning face is provided on the pressing plate, wherein the pressing plate comprises a pressing face opposite to the positioning face, and the fixing element is pressed against the pressing face.

4. The conveyor belt connecting device according to claim 2, wherein the segment to be connected is provided between the pressing plate and the pad, and the fixing element is pressed against the pressing plate, wherein the positioning face is provided on the pressing plate or the pad.

5. The conveyor belt connecting device according to claim 4, wherein the pressing plate or the pad provided with the positioning face has the same structure and is made of the same material as the segment to be connected.

6. The conveyor belt connecting device according to claim 1, wherein the clamping space penetrates through a first end face and a second end face of the connecting body which are opposite to each other, and the segment to be connected extends from the first end face to the second end face.

7. The conveyor belt connecting device according to claim 6, wherein the connecting body is provided with an opening on a third end face connected with the first end face and the second end face, and the clamping space is exposed through the opening.

8. The conveyor belt connecting device according to claim 1, wherein the connecting body is further provided with connecting holes for the connection to a driving device.

9. The conveyor belt connecting device according to claim 6, wherein connecting holes for the connection to a driving device are provided in the second structure part.

10. The conveyor belt connecting device according to claim 1, wherein the fixing element comprises a plurality of screws.

11. The conveyor belt connecting device according to claim 10, wherein the plurality of screws penetrate through the upper plate body and is pressed against the pressing plate.

12. The conveyor belt connecting device according to claim 1, wherein the segment to be connected is of an entire segment structure connected in one piece, or comprises a first connecting segment and a second connecting segment which are separated from each other.

13. A conveyor belt driving device, comprising the conveyor belt connecting device according to claim 1.

* * * * *